(12) United States Patent
Stoffels et al.

(10) Patent No.: US 6,695,392 B2
(45) Date of Patent: Feb. 24, 2004

(54) BODY STRUCTURE OF A MOTOR VEHICLE

(75) Inventors: Oliver Stoffels, Ludwigsburg (DE); Thomas Meier, Rheinstetten (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/351,579

(22) Filed: Jan. 27, 2003

(65) Prior Publication Data

US 2003/0178871 A1 Sep. 25, 2003

(30) Foreign Application Priority Data

Jan. 26, 2002 (DE) ......................... 102 02 984

(51) Int. Cl.$^7$ ................................. B60J 7/00
(52) U.S. Cl. ................ 296/187.09; 296/203.02; 296/203.04; 296/189; 280/788
(58) Field of Search ............... 296/187.09, 187.03, 296/187.05; 280/788, 784, 781

(56) References Cited

U.S. PATENT DOCUMENTS

| 3,655,237 | A | * | 4/1972 | Pitman | 296/187.09 |
| 3,819,224 | A | | 6/1974 | Casey et al. | |
| 3,831,997 | A | * | 8/1974 | Myers | 296/187.09 |
| 4,267,895 | A | * | 5/1981 | Eggert, Jr. | 296/187.09 |
| 4,311,335 | A | * | 1/1982 | Winiecki | 296/187.09 |
| 4,429,914 | A | * | 2/1984 | Bez et al. | 296/187.09 |
| 4,466,653 | A | * | 8/1984 | Harasaki | 296/187.09 |
| 4,573,707 | A | | 3/1986 | Pabst | |
| 4,811,812 | A | * | 3/1989 | Cassese | 280/788 |
| 4,869,539 | A | * | 9/1989 | Cassese | 280/788 |
| 5,244,248 | A | * | 9/1993 | Bovellan | 296/187.09 |
| 5,743,590 | A | * | 4/1998 | Baumann | 296/203.02 |
| 6,203,098 | B1 | * | 3/2001 | Motozawa et al. | 296/187.09 |
| 6,273,486 | B1 | * | 8/2001 | Ezzat et al. | 296/187.09 |
| 6,312,028 | B1 | * | 11/2001 | Wilkosz | 296/187.09 |
| 6,394,535 | B1 | * | 5/2002 | Kawamura et al. | 296/187.09 |
| 6,398,292 | B2 | * | 6/2002 | Tsuruta et al. | 296/187.09 |
| 6,406,088 | B1 | * | 6/2002 | Tate | 296/187.09 |
| 6,533,348 | B1 | * | 3/2003 | Jaekel et al. | 296/203.04 |
| 2001/0037908 | A1 | * | 11/2001 | Motozawa et al. | 296/189 |
| 2002/0093221 | A1 | * | 7/2002 | Forssell et al. | 296/203.02 |
| 2003/0025358 | A1 | * | 2/2003 | Taguchi et al. | 296/203.02 |
| 2003/0107241 | A1 | * | 6/2003 | Ritchie et al. | 296/203.02 |

FOREIGN PATENT DOCUMENTS

| DE | 30 38 920 | | 5/1982 |
| DE | 4104894 | A1 | 9/1991 |
| WO | WO 99/32346 | | 7/1999 |
| WO | WO 00/31344 | | 6/2000 |

OTHER PUBLICATIONS

European Search Report dated Nov. 3, 2003.

* cited by examiner

*Primary Examiner*—Kiran Patel
(74) *Attorney, Agent, or Firm*—Crowell & Moring LLP

(57) ABSTRACT

This body structure is suitable for a motor vehicle, especially for a passenger car, which is provided with deformation elements of metal, which extend at a distance from the longitudinal median plane of the vehicle. When viewed in the height direction of the vehicle, these deformation elements have several deformation hollow supports, which are one above the other and extend, for example, between a front region and a dimensionally stable passenger compartment. To optimize the body structure, each deformation element has a first, lower deformation hollow support, a second, middle deformation hollow support and a third, upper deformation hollow support, the deformation hollow supports connecting relatively short cross-members and being connected through the agency of a mounting plate with a transverse wall of the passenger compartment in their end region facing the front region.

17 Claims, 3 Drawing Sheets

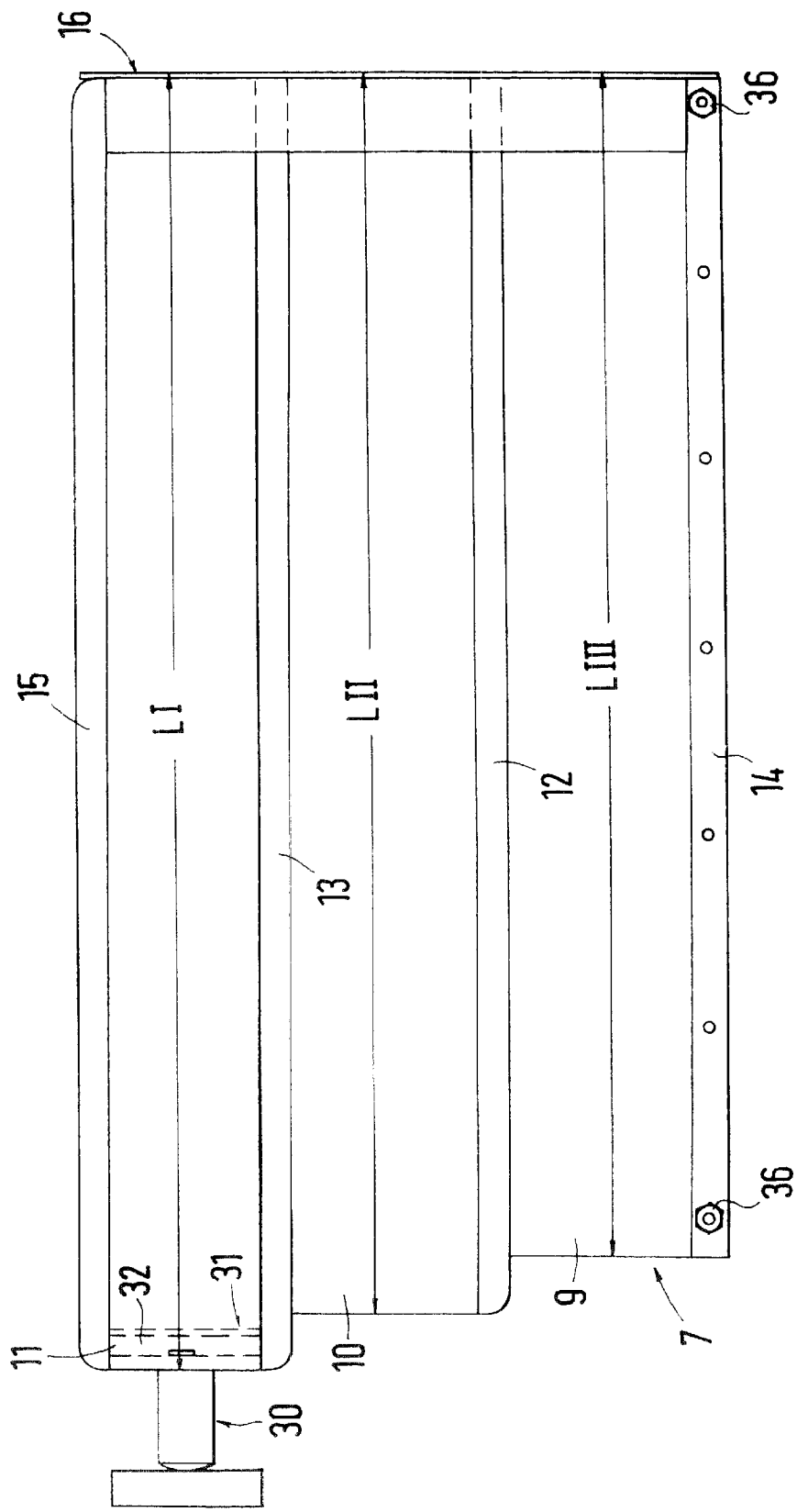

BODY STRUCTURE OF A MOTOR VEHICLE

BACKGROUND AND SUMMARY OF THE INVENTION

This application claims the priority of German Patent Document 102 02 984.9, filed on Jan. 26, 2002, the disclosure of which is expressly incorporated by reference herein.

The invention relates to the body structure of a motor vehicle, especially a passenger car, which is provided with deformation elements which extend at a distance from a longitudinal median plane of the vehicle, have several deformation hollow supports, one above the other in a height direction of the vehicle, and extend between a front region and a dimensionally stable passenger compartment.

A body structure of a motor vehicle is known from German Patent Document DE 30 38 920 A1 (and corresponding U.S. Pat. No. 4,429,914) and has a supporting system extending between a front and a transverse wall of a passenger compartment. The supporting system comprises walls, extending outside of a central longitudinal plane of the motor vehicle, disposed upright over the whole height of a front section, each wall having an inner part and an outer part and, for the collision-related energy absorption, two deformation hollow supports, which are superimposed when viewed in the height direction of the vehicle.

U.S. Pat. No. 3,819,224 discloses a front section of a motor vehicle, which has, within the wheels, an upper and a lower longitudinal support per longitudinal side of the vehicle. These longitudinal supports lead away from regions of the body, which are adjacent to the passenger compartment, and end in fork-shaped sections of mounting supports, which are aligned with free ends to a shock absorber.

It is an aspect of the invention to create deformation elements for a body of a vehicle, which, in the case of concerted energy absorption, have a simple construction and can easily be integrated in a body structure.

Pursuant to certain preferred embodiments of the invention, this aspect may be accomplished in that each of the deformation elements has a first, lower deformation hollow support, a second, middle deformation hollow support, and a third, upper deformation hollow support, the deformation hollow supports connecting relatively short cross-members and, in an end region averted from the front region, being connected through a mounting plate with a transverse wall of the passenger compartment. Further distinguishing features, developing the invention, are contained hereinbelow. The main advantages, achieved with certain preferred embodiments of the invention, are seen to lie therein, that the three deformation hollow supports of the deformation elements absorb energy functionally efficiently in the event of a collision. A deformation element, so fashioned, is distinguished by the fact that it can be exchanged easily, for example, in the deformed state, and by a clear construction, only conventional measures being required for integrating into a body structure or for connecting it with a passenger compartment. The fact, that the deformation hollow supports and the cross-members are formed by assembled half shells, contributes to the relative inexpensive manufacture of the deformation element. Finally, the mounting plate and the mounting devices produce an effective connection with the deformation hollow supports and also with the transverse plate of the passenger compartment.

Other objects, advantages and novel features of the present invention will become apparent from the following detailed description of the invention when considered in conjunction with the accompanying drawings.

BRIEF DESCRIPTION OF THE DRAWINGS

FIG. 4 shows a view in the direction of arrow B of FIG. 3.

DETAILED DESCRIPTION OF THE DRAWINGS

Figure 3:
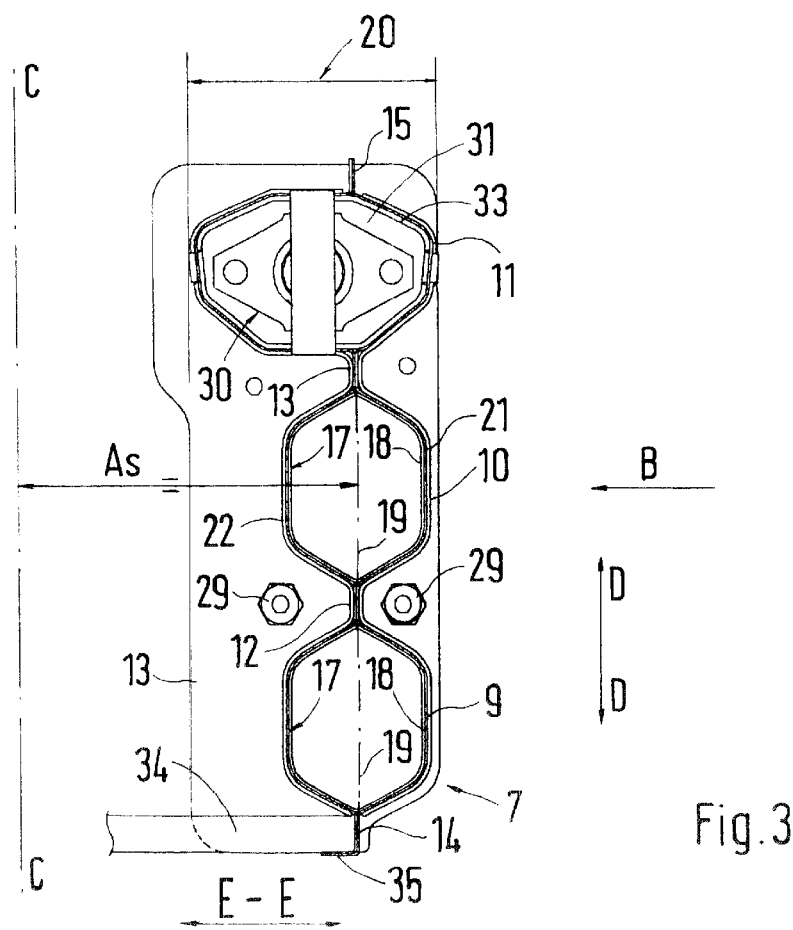
FIG. 3 shows a view in the direction of arrow A of FIG. 2.

Of a motor vehicle 1, for example, of the two-seater passenger car type, only the body structure 2, with a dimensionally stable passenger compartment 3 and a front region 4 are shown. The passenger compartment 3 preferably is made of a non-metallic composite material, as described, for example, in U.S. Pat. No. 4,573,707 and is bounded on the side, facing the front region 5, by a transverse wall 6, adjoining which there is a forward space. The body structure 2 is provided with deformation elements 7 and 8, which extend at the same distance as from a longitudinal median plane C—C of the vehicle, are made, for example, of metal and extend between the front region 5 and the transverse wall 6. Each deformation element 7 comprises three deformation hollow supports, which lie one above the other in the height direction D—D of the vehicle, that is, a first, lower deformation hollow support 9, a second, middle deformation hollow support 10 and a third upper deformation hollow support 11. The deformation hollow supports 9, 10, and 11 are connected with one another by way of relatively short cross-members 12 and 13, as shown in FIG. 3. In addition, further, short cross-members 14 and 15, which, like the cross-members 12 and 13, extend in the height direction D—D of the vehicle, lead away from the first, lower deformation hollow support 9 and from the third, upper deformation hollow support 11. In order to fasten the deformation element 7 at the transverse wall 6, it is provided at its end region Eb, averted from the front region, with a mounting plate 16.

In the example, the first lower, deformation hollow support 9 and the second middle deformation hollow support 10, as seen in cross-sectionr, have two assembled trapezoids 17 and 18, the longer sides 19 of which extend in the height direction D—D of the vehicle. Due to this construction, the cross-sectionr of the deformation hollow support 9 and 10 is hexagonal. In contrast to this, the third upper deformation hollow support 11 is octagonal, a longer side 20 of the cross-sectionr extending in the transverse direction E—E of the vehicle.

To simplify the manufacture, the deformation hollow supports 9, 10 and 11 and the cross-members 12, 13 and 14, 15, are formed by shells, preferably by two half shells 21 and 22, which are put together at the cross-members 12, 13 and connected to one another by suitable methods, such as welding.

Figure 1:
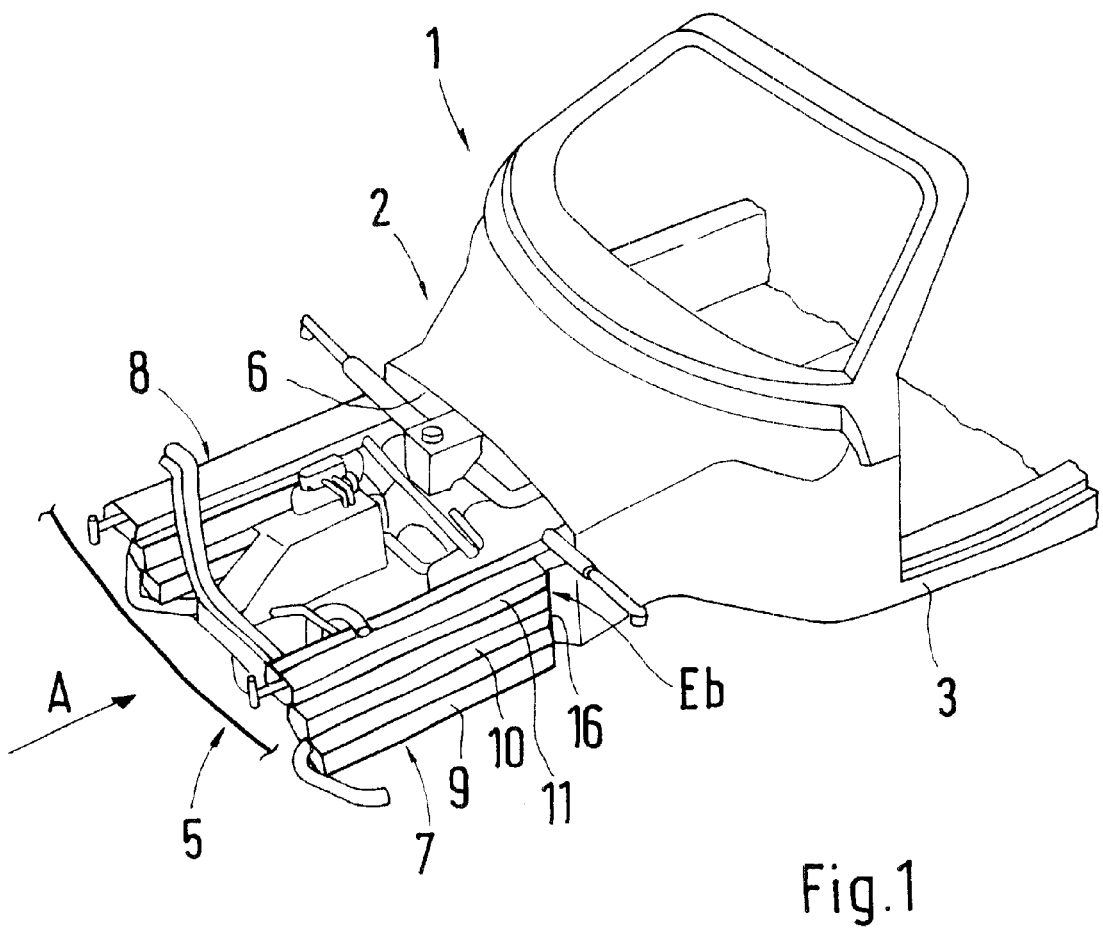
FIG. 1 shows an inclined view of a body structure with deformation elements, which extend between a front region and a passenger compartment.
Figure 2:
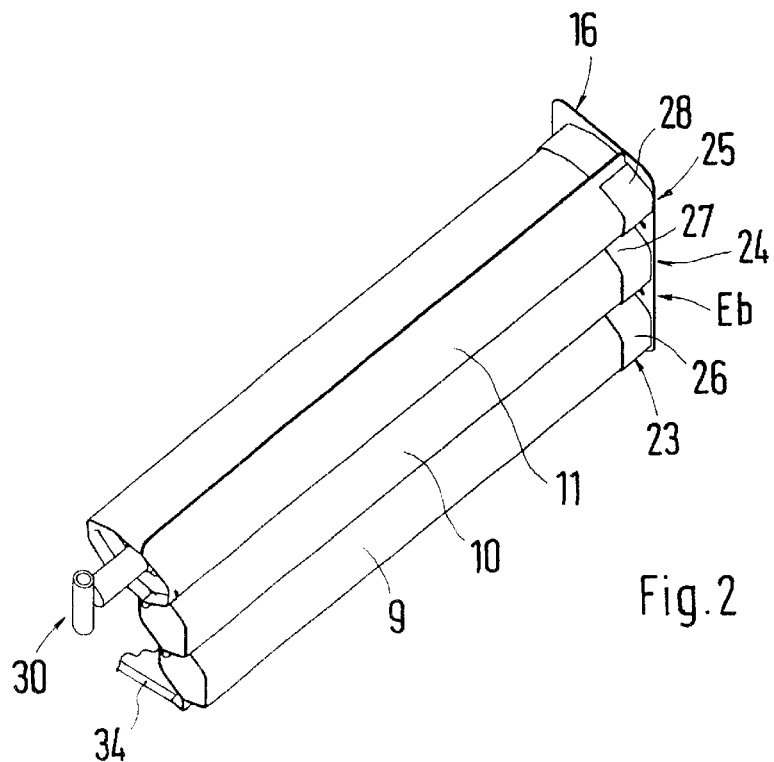
FIG. 2 shows an inclined view of a deformation element.

The mounting plate 16 is provided with mounting devices 23, 24 and 25 for the deformation hollow supports 9, 10 and 11. The mounting devices 23, 24 and 25 are formed by collar-like flanges 26, 27 and 28, which positively surround the deformation hollow supports 9, 10 and 11 at least sectionally, as shown in FIG. 2. The flanges 26, 27 and 28 and the deformation hollow supports 9, 10 and 11 are held in position by suitable connecting measures such as gluing, welding or the like. In addition, the deformation element 7 is held by way of the mounting plate 16 and through the agency of screws 29, so that it can be detached and exchanged, for example, after a deformation caused by an accident.

The third upper deformation hollow support 11 is constructed to accommodate a metallic shock absorber 30. For this purpose, an insert 31 is introduced into this deformation hollow support 11 and serves for the fastening of the metallic shock absorber 30. The insert 31 is in contact with a flange 32 and an inner side 33.

As shown in FIG. 4, the deformation hollow supports 9, 10 and 11 have different lengths L I, L II and L III. The length L III of the third upper deformation hollow support 11 is greater than the length L II of the second, Middle deformation hollow support 10 and the length L II of the second, middle deformation hollow support 10 is greater than the length L I of the lower deformation hollow support 9. Due to this configuration, a stepped absorption of energy by the deformation hollow supports 9, 10 and 11 is achieved.

Finally, a flat supporting plate 34 of metal or a composite material, which extends between the cross-members 14 of said deformation elements and rests on horizontal flanges 35 of the cross-members 14, is provided between the deformation elements 7, 8. The supporting plate 34 is fastened to the cross-members 14 by way of one or more screws 36

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body structure of a motor vehicle which is provided with deformation elements, which extend at a distance from a longitudinal median plane of the vehicle, have several deformation hollow supports, one above the other in a height direction of the vehicle, and extend between a front region and a dimensionally stable passenger compartment, wherein each of the deformation elements has a first, lower deformation hollow support, a second, middle deformation hollow support and a third, upper deformation hollow support, the deformation hollow supports connecting relatively short cross-members and, in an end region averted from the front region, being connected through a mounting plate with a transverse wall of the passenger compartment.

2. The body structure according to claim 1, wherein at least the first, lower deformation hollow support and the second, middle deformation hollow support, seen in cross-sectionr, are formed by two assembled trapezoids, longer sides of which extend basically in the height direction of the vehicle.

3. The body structure according to claim 1, wherein the third upper deformation hollow support, in cross-sectionr, is polyhedral, a longer side of the cross-sectionr extending in a transverse direction of the vehicle.

4. The body structure according to claim 1, wherein the deformation hollow supports and the cross-members are formed by shells.

5. The body structure according to claim 2, wherein the deformation hollow supports and the cross-members are formed by shells.

6. The body structure according to claim 3, wherein the deformation hollow supports and the cross-members are formed by shells.

7. The body structure according to claim 4, wherein the shells are put together at the cross-members and connected to one another by gluing, welding, or the like.

8. The body structure according to claim 1, wherein the mounting plate of the deformation element is provided with mounting devices for the deformation hollow supports.

9. The body structure according to claim 8, wherein the mounting devices are embraced by collar-like flanges, which lead away from the mounting plate and surround the deformation hollow supports positively at least in sections.

10. The body structure according to claim 9, wherein the deformation hollow supports and the flanges of the mounting plate are connected to one another by gluing, welding, or the like.

11. The body structure according to claim 1, wherein, the third upper deformation hollow support is constructed to accommodate a metallic shock absorber.

12. The body structure according to claim 11 wherein an insert, by way of which the metallic shock absorber is fastened, is accommodated in an inside of the third, upper deformation hollow support.

13. The body structure according to claim 12, wherein the insert lies with a flange in contact with the inside of the deformation hollow support.

14. The body structure according to claim 1, wherein the deformation element is held exchangeably by way of the mounting plate and is held and through screws at the transverse wall of the passenger compartment.

15. A deformation element for a front region of a vehicle, comprising:

a first, lower deformation hollow support, a second, middle deformation hollow support, a third, upper deformation hollow support, a first connecting cross-member between the lower and middle deformation hollow supports, a second connecting cross-member between the middle and upper deformation hollow supports, and a mounting plate for connection with a transverse wall of a passenger compartment, in use.

16. A method of using a body structure of a motor vehicle comprising utilizing the body structure of claim 1.

17. A method of making a body structure of a motor vehicle comprising making the body structure of claim 1.

* * * * *